United States Patent [19]

Wilson et al.

[11] Patent Number: 5,734,435
[45] Date of Patent: Mar. 31, 1998

[54] VIDEO PROCESSING TO CONVERT BETWEEN FIELD RATES

[75] Inventors: Peter Wilson, Portsmouth; Martin Weston, Hampshire; Steve Dabner, East Sussex, all of England

[73] Assignee: Snell & Wilcox Ltd., Hampshire, England

[21] Appl. No.: 381,534

[22] Filed: Feb. 1, 1995

[30] Foreign Application Priority Data

Feb. 1, 1994 [GB] United Kingdom ............ 9401897

[51] Int. Cl.⁶ ............................ H04N 7/01; H04N 11/20
[52] U.S. Cl. ............................ 348/459; 348/443; 348/447; 348/448; 348/911
[58] Field of Search ............................ 348/443, 444, 348/447, 448, 449, 441, 459, 911, 452, 500, 513, 514, 536; H04N 7/01, 11/20

[56] References Cited

U.S. PATENT DOCUMENTS

| | | | |
|---|---|---|---|
| 4,607,282 | 8/1986 | Van de Polder | 348/447 |
| 4,989,091 | 1/1991 | Lucas | 348/458 |
| 5,115,311 | 5/1992 | Jaqua | 348/911 |
| 5,221,966 | 6/1993 | Clayton et al. | 348/444 |
| 5,313,281 | 5/1994 | Richards | 348/443 |
| 5,321,500 | 6/1994 | Capitant et al. | 348/459 |
| 5,353,119 | 10/1994 | Doricott et al. | 348/459 |
| 5,404,171 | 4/1995 | Goldstein et al. | 348/459 |

FOREIGN PATENT DOCUMENTS

| | | | |
|---|---|---|---|
| 91/06182 | 5/1991 | WIPO | H04N 7/01 |
| WO93/15586 | 8/1993 | WIPO | H04N 7/01 |

OTHER PUBLICATIONS

H. Sakata et al, NHK Technical Monograph, No. 17, Mar. 1971, "Television Standards Converter", pp. 3–37.

Primary Examiner—John K. Peng
Assistant Examiner—John W. Miller
Attorney, Agent, or Firm—Lowe, Price, LeBlanc & Becker

[57] ABSTRACT

A method for converting between relatively close field rates of perhaps 60 Hz and 59.94 Hz, monitors the phase difference between input and output field rates. Initially, output fields are created by synchronising input fields. As the measured phase passes a threshold, the method switches to interpolation mode for a short, fixed interval and then returns to synchronization. The method offers much of the sharpness associated with simple synchronization but avoids the visible discontinuities of field drops or repeats.

3 Claims, 4 Drawing Sheets

VIDEO PROCESSING TO CONVERT BETWEEN FIELD RATES

This invention relates to video processing and more particularly to techniques for converting video signals from one field rate to another and to apparatus making use such techniques.

One important application lies in the conversion of signals to and from high definition television (HDTV) formats. The SMPTE 240M HDTV system has a field rate of exactly 60 Hz. As will be later described in more detail, there are a number of important applications in which it is necessary to convert an HDTV signal to current broadest standards. In the case of NTSC, this will result in a conversion in field rate from 60.00 Hz to 59.94 Hz and it has already been recognised that this conversion requires a field to be dropped every 16 seconds. Conversely, instead of down-converting a signal from 60.00 Hz HDTV to 59.94 Hz NTSC, there are applications which require up-conversion from 59.94 Hz NTSC to 60.00 Hz HDTV. It will then be necessary to repeat a field every 16 seconds.

In certain applications, whether involving conversion of field rates between 60.00 Hz and 59.94 Hz or other closely spaced field rates, this intermittent dropping or repeating of a field is perceptible and visually objectionable. There exists the alternative, using current techniques, of interpolating in the manner of a broadest standards conveyer from one field rate to the other. Inevitably, however such interpolation produces a softening of the visual image. This too can be objectionable.

It is an object of the present invention to provide a method for converting video signals between field rates, usually closely spaced, that avoids abrupt and perceptible field transitions without introducing appreciable softening of the overall image.

Accordingly, the present invention consists in one aspect in a method of converting a video signal between field rates respectively F and F+/−Δ per second, wherein conversion is perfumed in a synchronisation mode over a first portion of the time interval 1/Δ and performed in an interpolation mode over a second portion of said time interval.

By synchronization is meant the creation the creation of output fields without temporal interpolation, or at least without temporal interpolation of low spatial frequencies. It will be recognized that a converter may be contributions from adjacent fields in order to improve the high frequency performance, but—provided there is no temporal interpolation of low frequency information—blurring or smoothing of the picture will be avoided.

Preferably, the phase difference between input and output fields is monitored and the interpolation mode is invoked as the phase difference exceeds a predetermined threshold.

Advantageously, the interpolataion mode is sustained for a fixed time interval after it is invoked.

The present invention will find particular application in HDTV up- and down-converters, where element of the hardware necessary to conduct interpolation between fields, may serve also in improving the line inaterpolation conducted between 1125 and 525 lines. There will be other applications, however, in converting video signals between closely spaced field rates, where it is desirable to avoid abrupt and perceptible field transitions and where the additional costs involved in conducting interpolation are justified in terms of the performance demanded. One such application will be high specification synchronizers.

The SMPTE 240M HDTV system has a similar picture quality to 35 mm cinematographic film. Even before widespread broadcasting of HDTV, the availability of HDTV receivers and domestic HDTV laser disc players will create a market for film material in the HDTV format There accordingly exists the massive task of transferring 16 mm and 35 mm film material to HDTV.

The conversion of video material between NTSC and PAL broadcast standards is commonplace. The NTSC standard has a field rate of 59.94 Hz compared with the 50 Hz field rate of the PAL standard. A broadcast quality standards converter will utilize a field aperture of four fields or more, to conduct field interpolation between the 59.94 Hz and 50 Hz field rates.

It is a frequent requirement to produce NTSC or PAL video material in a telecine operation from 16 mm or 35 mm cinematographic film. With rare exceptions, film is intended to run at 24 frames per second. To convert from the resulting field rate of 48 HZ to the NTSC standard, the well-known "3-2 pull-down system" is used to duplicate certain fields. The resulting NTSC signal, while having a slightly stuttery motion, is acceptable for broadcast, A PAL video signal can be created in a telecine operation from cinematographic film with an appropriate modification to running speed to convert from 48 Hz to 50 Hz. A special problem arises when it is necessary to create a PAL signal not from the original film, but from an NTSC signal telecined using the 3-2 pull-down system. Conventional standards conversion will result in artifacts arising from the artificial field sequence which is generated in the 3-2 pull-down system. A solution to this problem is provided in WO 91/06182 which describes a technique for recognizing and removing the duplicate fields before converting to the PAL line standard.

It is generally accepted that program material, originated in HDTV and then down converted to current broadcast standards, has a picture quality that far surpasses the quality available from "normal" sources. Accordingly, an advantage is seen in the ability to create both NTSC and PAL masters from an HDTV telecined master, even where, say, a direct NTSC telecine of the film material in question, already exists. The NTSC and PAL masters produced in this way will be expected to have extremely high picture quality. If it can be arranged that the HDTV, NTSC and PAL masters have an inherently close match, there will be a considerable time and money saving in that the transfer will require to be approved only once by the director or other individual responsible for visual quality.

It is an object of a further aspect of the present invention to provide improved apparatus to this end.

Accordingly, the present invention consists, in a further aspect, in apparatus for the simultaneous creation of NTSC and PAL masters from an HDTV telecined master, comprising means for receiving a 3-2 pull-down phase signal indicative of the phase of the field processing in the telecine operation from 24 frames per second cinematographic film to 1125 lines and 60 fields per second (1126/60) high definition television (HDTV); down converter means receiving 1125/60 HDTV input and serving to line convert from 112.5 to 525 lines, to field convert from 60 to 59.94 fields per second in dependence upon said phase signal and to create a modified phase signal including identification of dropped fields; and cross converter means receiving 525/59.94 input and to line convert from 525 to 625 lines and to field convert from 59.94 fields per second to 47.952 fields per second in dependence upon said modified phase signal.

In still further aspect, the present invention consists in apparatus for the simultaneous creation of NTSC and PAL masters from an HDTV telecined master, comprising first means, including a telecine, for producing from 24 frames per second cinematographic film, a high definition television (HDTV) signal at 1125 lines and 59.94 fields per second (1125/59.94) said first means further providing a modified 3-2 pull-down phase signal indicative of the phase of the field processing in the telecine operation and timed at 59.94 fields per second; down converter means receiving 1125/59.94 HDTV input and serving to line convert from 1125 to 525 lines; and cross converter means receiving 525/59.94 input and to line convert from 525 to 625 lines and to field convert from 59.94 fields per second to 47.952 fields per second in dependence upon said modified phase signal.

This invention will now be described by way of examples with reference to the accompanying drawings in which.

Figure 1:
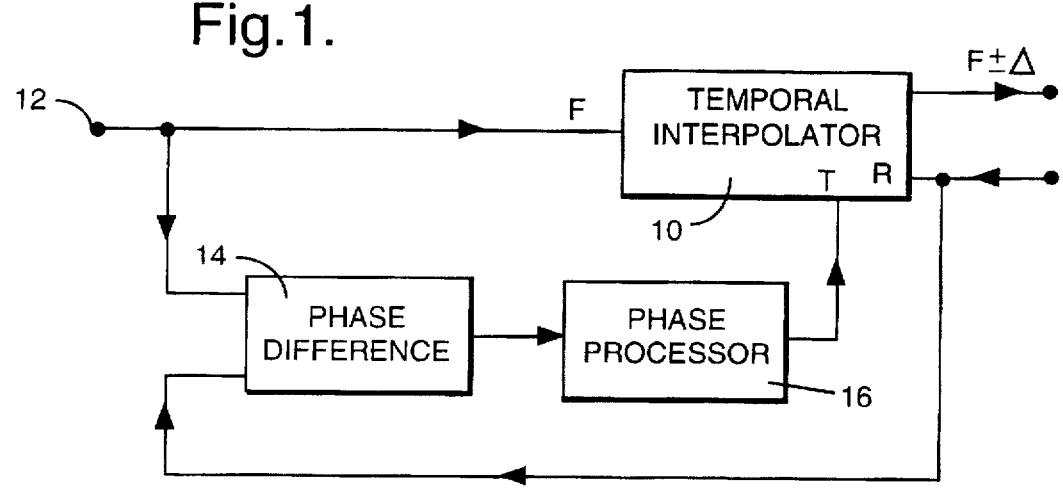
FIG. 1 is a block diagram illustrating apparatus according to the invention for converting a video signal between field rates.

Turning to the drawings, FIG. 1 shows a temporal interpolator 10 receiving an input video signal from terminal 12 with an input field rate F. The temporal interpolator receives at terminal R, a reference timing signal at the desired output field rate F+/−Δ. The temporal interpolator receives at terminal T a temporal phase control signal. In known manner, the temporal interpolator includes one or more field delays and combines information from neighboring fields with relative weighting determined by the temporal phase control to produce a video signal at the desired output field rate F+/−Δ.

The input video signal is compared in phase difference unit 14 with the output field rate signal to derive a measure of phase difference. This phase difference unit can take the form of a counter which is started at the beginning of an input field and stepped at the beginning of an output field. The derived measure of phase difference, suitably scaled, is taken to a phase processor unit 16.

The function of the phase processor is two-fold. First, a determination is made from observing the rate of change of the phase difference signal, whether the field rate difference is small enough for synchronization to be appropriate. That is too say, there are likely to be no temporal artifacts which outweigh the increased sharpness in a synchronization processor. If the field rate difference is not small enough, the phase processor generates a temporal phase control signal by effectively passing the phase difference signal transparently. The form of the temporal phase control signal is shown in plot a) of FIG. 2; this leads to what might be termed conventional temporal interpolation. The skilled man will recognize that as a practical matter, the phase difference in the interpolation is quantized and this is indicated schematically at plot b) of FIG. 2.

Figure 2:
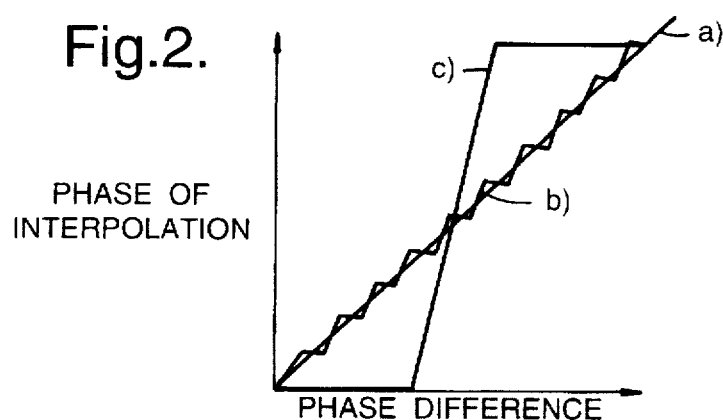
FIG. 2 is a series of graphical plots illustrating the operation of apparatus shown in FIG. 1.

If the field rate difference is determined to be small enough for synchronization to be appropriate the phase processor 16 functions to generate a temporal phase control signal as shown in FIG. 2 at c). The control signal initially remains low as the phase difference increases; there is no temporal interpolation (or, at least, no temporal interpolation of low spatial frequencies) and the system can be said to be in synchronization mode. At an appropriate point, the temporal phase control signal begins to rise with the phase difference signal, but at an increased gain. Over this ramp section of the temporal phase control signal, the system is of course in interpolation mode and the temporal interpolator operates to create output fields which combine low spatial frequency information from neighboring fields, with relative weighting determined by the instantaneous value of the temporal phase control signal. Once the temporal phase control signal reaches the high value, the system is once more in synchronisation mode.

It will be recognized that phase is circular in this context and that the high and low limits of the temporal phase control signal are effectively equivalent. In a manner which will depend for detail on the particular architecture of the temporal interpolator 10, a field will be dropped or repeated as the read and write rates in the interpolator overtake one another. The visual discontinuity that this would otherwise create is effectively masked in the interpolation mode.

Figure 3:
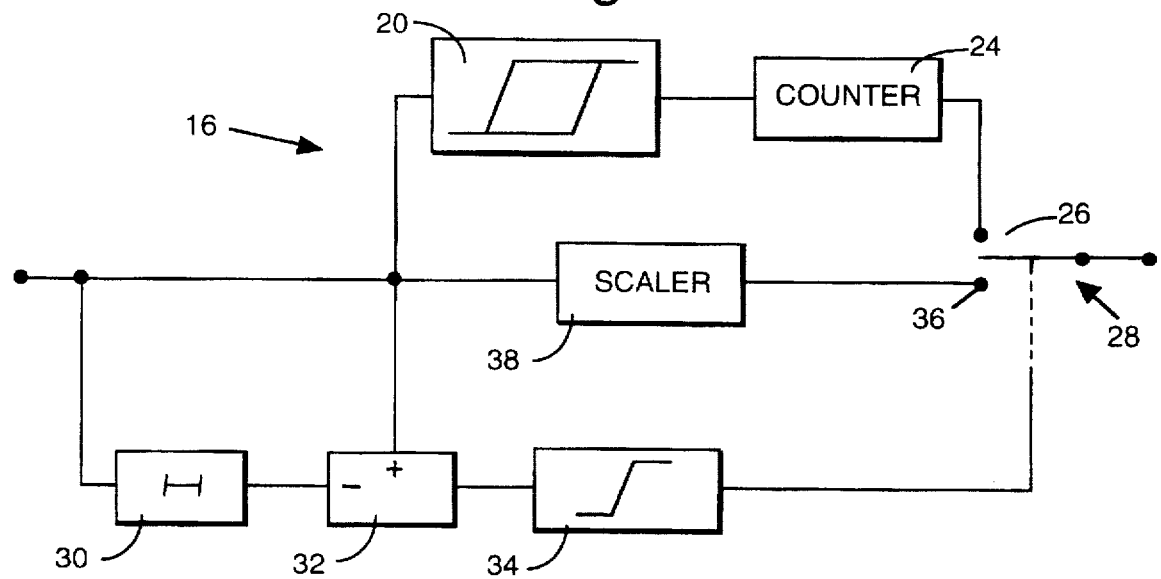
FIG. 3 is a block diagram illustrating in more detail the phase processor shown in FIG. 1.

One embodiment of phase processor 16 is shown in FIG. 3.

The phase difference signal from fie phase difference unit 14 is compared in hysteresis comparator 20 with a preset limit. As that limit, plus or minus the hysteresis parameter, is passed in either direction, a start pulse is sent to counter 24 which ramps up or down as appropriate over a fixed time interval of duration of, say, 0.5 seconds. There thus appears at contact 26 of switch arrangement 28, a temporal phase control signal of the form shown in FIG. 2 c).

In this way the desired object has been achieved. Synchronization mode, with its inherent sharpness, is sustained for as long as practicable. Interpolation is conducted to camouflage the field drop (or repeat) for a period set by counter 24 which is too short for the loss in sharpness to become apparent.

Figure 4:
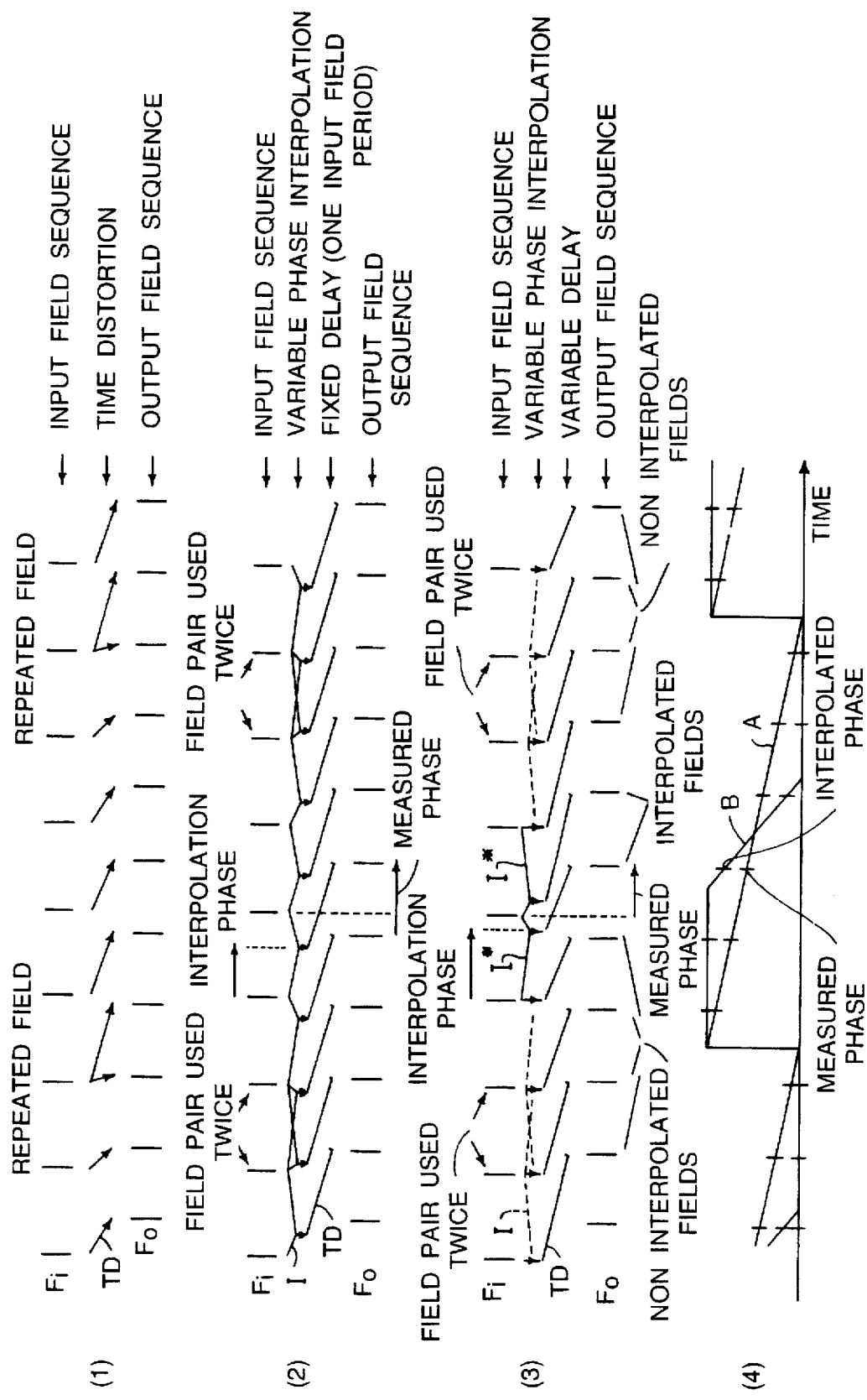
FIG. 4 is a series of graphical plots illustrating a method according to the present invention.

It is instructive to look more closely at what have been called the synchronization and interpolation modes and for this purpose, reference is directed to FIG. 4. This shows on separate lines (1) to (4), but with common timing of fields in the horizontal direction, schematic views of synchronisation, interpolation, an arrangement according to the present and invention and the contrasting phase relationships.

FIG. 4 shows in line (1) the prior art approach of synchronization. Information for each output field $F_o$ is taken essentially from one input field $F_I$, this introducing time distortion which varies as the relative phase of the input and output fields passes through a cycle. (For the sake of simplicity a 1:1.2 ratio has been selected for the drawing; the present invention is more typically concerned with a ratio around 1:1.001). The time distortion is illustrated by arrows TD. It will be seen that every fifth input field is used twice to produce the required number of output fields.

This approach will be expected to produce sharp pictures, since the information (and particularly the low frequency information) for each output field originates from a single input field. The repeated field will be expected, however, to be visually objectionable.

The interpolation approach is illustrated schematically in line (2), with the same input and output fields. Each output field $F_o$ is constructed by interpolation between two input fields $F_I$ identified in the Figure by brace 1. The phase of the interpolation in each case is illustrated by the position of the arrowed apex of the brace 1 and it will be seen that this interpolation phase, measured with respect to an input field, is labelled towards the center of the line. Of course, this interpolation phase is identical with What might be termed the measured phase, that is to say the location in time (disregarding an integral field delay indicated by arrow TD) of an intended output field with respect to the input fields from which it is to be derived. This may be regarded as a self evident feature of interpolation but the analysis, which is new, will assist in a fuller understanding of the present invention.

Reference is now directed to line (4) of FIG. 4, which sinews at plot A the essentially saw-tooth relationship between interpolation phase and time. The positions of output fields $F_o$ are marked on the plot. With the simple arrangement shown, interpolation phase takes a modulo-6 form.

Interpolation will avoid the stutter associated with field repeats (or field drops) but will inevitably soften the image.

Turning, then, to line (3) of FIG. 4, an illustration is given of the manner of operation of the present invention taking, it must be remembered, the artificially high field rate ratio of 1:1.2.

Initially, the system is in synchronization mode. The connections are of course in place for interpolation and it is therefore convenient still to show a brace l linking two input field, however the information (or at least the low frequency information) is taken from only one field. To signify this in FIG. 4, the arrowed apex is towards one end of the brace, and the remainder of the brace is shown in dotted outline, showing that no information is taken from the input field at that end of the brace. The output fields are not interpolated and are sharp.

The measured phase which is shown against the output fields towards the center of line (3), corresponds to the phase which is in reality measured as described elsewhere in this specification. When this measured phase exceeds a threshold, the system passes (again as described) into interpolation mode. This is signified in the Figure by solid braces l* with the arrowed apex of each brace showing the interpolation phase, that is to say the relative contributions taken from the two input fields. This interpolation phase is dictated by the ramp signal generated by the phase processor 16 (as seen in FIG. 2) and is not the same as the measurement phase. For ready reference, the ramp signal is shown in line (4) of FIG. 4, at plot B. The interpolation phase has, as before, a full height step as the phase passes through the modulus 6. For a period after the step, however, the ramp signal B remains at full height, before dropping rapidly to zero, where it remains until the next modulus step.

It is instructive to consider precisely what is happening, in each of the cases shown, as phase cycles from minimum to maximum. In the synchronization mode, this can be identified with the output fields which are the result of repeating input fields. In interpolation, the relevant output fields are those which arise in two separate interpolations from the same two input fields. In both these cases, assuming an architecture having numbered field stores being repeatedly written to and read in number order, this point is accompanied by an effective renumbering of the field stores. With the arrangement according to the present invention, the renumbering is all that remains. While two input fields are technically available to be used twice, the first operation takes wholly the first input field and the second operation wholly the second. The cycle is accordingly completed with additional fields having been generated "invisibly" at the affordable cost of a loss of sharpness for a small number of fields only. Thus, looking at the output fields $F_o$ of line (3), it will be observed that there are relatively large number of non-interpolated of synchronized fields, and are relatively small number of interpolated fields. The sharpness of synchronization has been maintained for as many fields as possible and the discontinuities of repeated or dropped fields have been avoided.

In a more practical arrangement, the field rate difference will usually be much smaller. It will be recognized that as the field rate difference $\Delta$ increases, the proportion of the overall time interval occupied by the interpolation mode will increase. The ratio between the durations of the interpolation and synchronization modes can rise significantly above the described ratio 0.5:16, although it is preferable for the synchronization to occupy the major portion of the time interval $1/\Delta$. At a considerably increased field rate difference, it will become impossible for the temporal control signal to ramp between its limits in the period available. To prevent this situation arising, the present invention proposes—as mentioned above—to check the field rate difference and to force the system into continuous interpolation mode.

Referring again to FIG. 3, the phase difference signal is taken through a delay unit 30 and the values of the measured phase differences for successive fields subtracted in subtracter 32. The subtraction provides an indication of the rate of change of the phase difference and thus of the field rate difference. The result of the subtraction is taken to a threshold unit 34 and if this exceeds a preset threshold, say 2 Hz, the unit 34 operates switch 28 to connect contact 36 with the output. This contact 36 receives original phase difference signal, suitably scaled in scaler 38. This form of temporal phase control signal forces the temporal interpolator into continuous interpolation mode.

Figure 5:
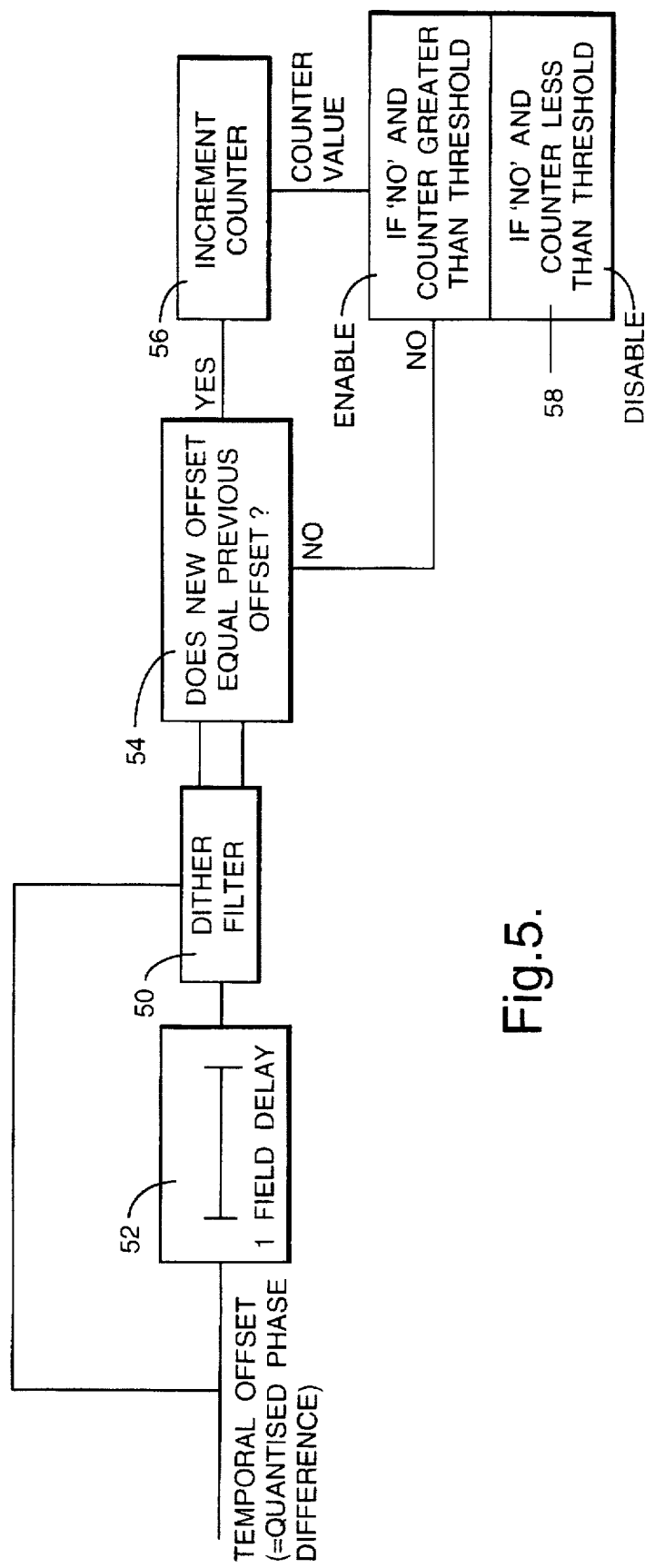
FIG. 5 is a block diagram illustrating a modification to the phase processor of FIG. 3.

An alternative approach is to count the number of successive fields over which the phase changes by a specified amount. Modified apparatus utilizing this approach will be described with reference to FIG. 5.

The quantized phase difference, typically in 3 bits, is taken to a dither filter 50 directly and through a field delay 52. The dither filter 50 provides two outputs which are essentially the "present" and "one-field-past" phase differences but processed in an attempt to remove quantization noise. Thus a slowly changing phased difference quantized to 3 bits might in an ideal case take the form:

000001111122222333334444455555666667777700000

However, the effect of quantization noise will be to produce something like:

00001011112122223233334344445555566666767770000

The dither filter operates to remove this effect essentially by ignoring transitions which are reversed one bit later.

The dither filter outputs pass to comparator 54 which detects transitions, which can now be assumed to be real and not the result of noise. The number of fields having the same (quantized) phase is monitored in increment counter 56. The count, together with the detection of a transition in quantizad phase, is presented to control box 58. Detection of a transition after a count has exceeded a threshold, will enable the combined synchronization/interpolation mode according to the present invention. A relatively high count of fields between phase transitions will of course denote slowly changing phase difference. Detection of a transition before the count has passed the threshold will disable the combined synchronization/interpolation mode, leading to continuous interpolation until a sufficiently high number of fields are again counted at the same phase difference.

It should be understood that other approaches can be adopted for processing the phase difference signal to produce the required temporal phase control signal such that conversion is in a synchronization mode for the major portion of the time interval 1/Δ and an interpolation mode far the remainder. Thus, the phase difference signal may be passed through a coring or other non-linear device fashioned to produce an output such as that shown in plot c) of FIG. 2. While this approach has the merit of simplicity and will produce an identical result to the approach described above, if Δ is constant, the way in which variations in Δ are treated will depart significantly. Thus, the point at which the mode changes from synchronisation to interpolation and the time spent in the interpolation mode (determined by the "gain" of the interpolation ramp), will vary as Δ varies. In another modification, no separate check is made to determine whether the field rate difference Δ is sufficiently small for synchronization, at least over a portion of time interval 1/Δ, to be appropriate. While this again has the merit of simplicity, the effect is to limit the category of input video signals thin can be handled by the apparatus. Generally speaking, the described arrangement, in which a change to continuous interpolation mode is forced if the rate of change of phase difference becomes too large, is felt to have important advantages. Of course, there will be other ways of forcing the system to a continuous interpolation for larger field rate differences. It can be observed that this system does not require separate means for checking whether the field rate difference Δ is large enough for a field to be dropped or repeated within a specific time scale. This is because, in the preferred arrangement, the change from synchronization mode to interpolation mode is "triggered" by the phase difference passing a threshold. If, in for example a synchronizer, the field rate difference Δ remains very small in a particular time scale, there may—in this time scale—be no change made to interpolation mode. Over a longer time scale there may be a change made to interpolation made if the phase difference accumulates to exceed the threshold.

The objective has been mentioned of providing an apparatus for the simultaneous creation of NTSC and PAL masters from a telecined HDTV signal.

As previously explained, the conversion from 24 frames per second film material in a telecine operation to 60 fields per second HDTV, involves the addition of fields in the well-known 3-2 pull-down. A subsequent conversion from HDTV to NTSC necessitates a field rate change from 60.00 Hz to 59.94 Hz, which can be performed in accordance with the present invention. To then produce a PAL signal requires—if artifacts are to be avoided—elimination of the fields added in the 3-2 pull-down. While W/O 91/06182 provides a suitable technique, the additional difficulty is encountered that the sequence of the 3-2 pull-down is corrupted every 16 seconds.

Figure 6:
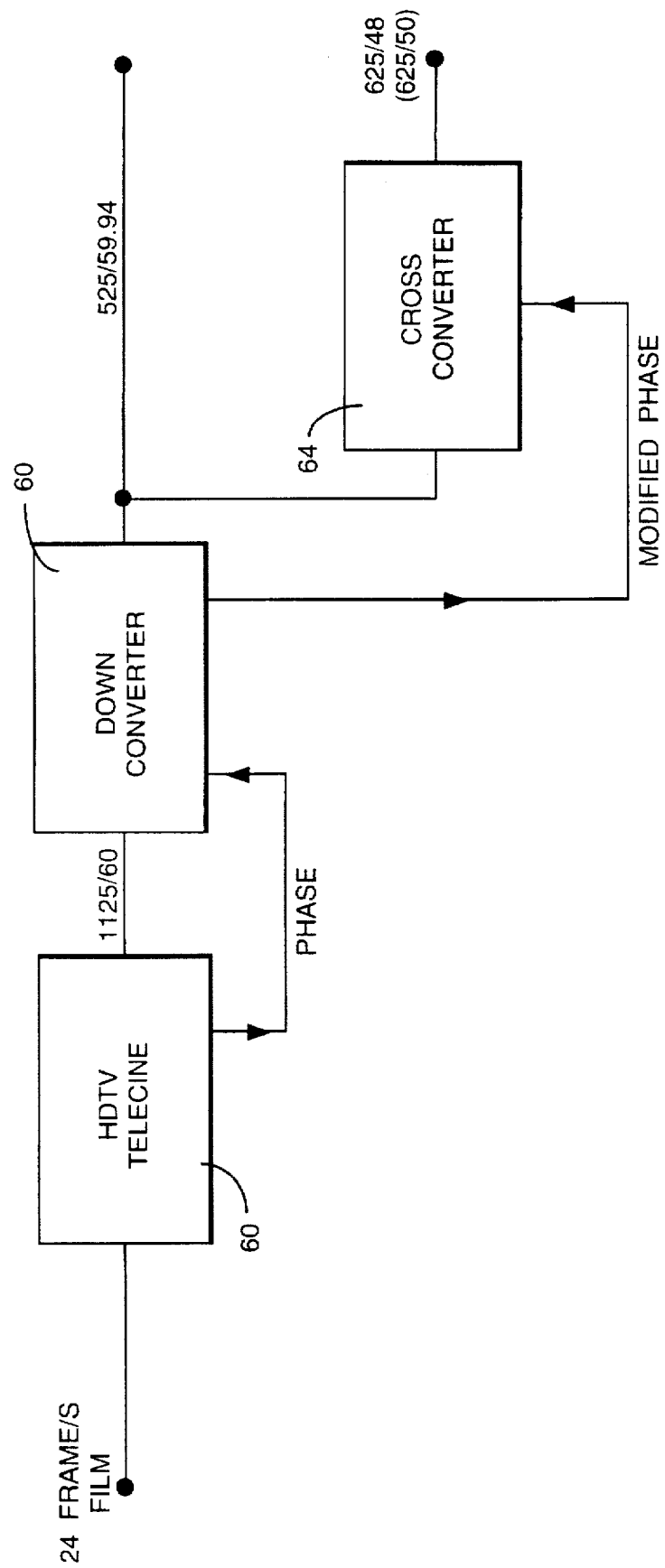
FIG. 6 is a block diagram illustrating apparatus for the simultaneous creation of NTSC and PAL rates.

Turning to FIG. 6, an HDTV telecine unit 60 operates on 24 frames per second cinematographic film to produce SMPTE 240M HDTV at 1125 lines and 60 fields per second (1125/60). The telecine unit also produces a phase output representing the 3-2 pull-down sequence. A down-converter unit 62 operates on the 1125/60 output to produce an NTSC 525/59.94 output. The down-converter 62 provides an optional delay for the phase output from the telecine and then uses the (optionally delayed) phase output in two ways. First, the phase signal is used to ensure that the field which is dropped every 16 seconds is a field that is a duplicate added in the 3-2 pull-down. Second, the phase signal is modified to indicate the dropping of fields and a modified phase signal is output to a cross-converter 44. The optional delay is an important feature. The video output from the telecine may well pass through other processes before it becomes available to the down-converter. One example is an external colorizer, that is to say a colorizer which operates directly upon the video output from the telecine, rather than indirectly by controlling the respective RGB gains of the telecine. If, as is quite possible, such additional processes involve field delays, the 3-2 pull-down signal will be out of phase and unusable for the present purpose. Accordingly, the down-converter according to a preferred form of this invention includes a phase delay enabling the user to select a delay of typically 1 to 5 fields, to bring the 3-2 pull-down signal back into phase with the video signal.

The cross-converter 64 receives the 525/59.94 signal and produces a 625/48 output. The cross-converter uses the modified and optionally delayed phase signal to "decode" the 3-2 pull-down with fields being deleted and re-ordered as appropriate. Because these operations are conducted in accordance with the modified phase signal—which takes into account the fields dropped at a 16 second interval—it can be ensured that there is continuous matching between frames of the 625/48 signal and the original cinematographic frames, by the use of videotape recorders operating at modified speed, it is possible—as is known—to produce a 625/50 PAL signal. Alternatively, the cross-converter can adapted to convert directly to 625/50.

It will be important throughout the conversion processes, to ensure that correct attention is paid to film frame dominance. It has been explained that in the PAL signal it is ensured that each video frame is composed of two fields from the same film frame. It is also necessary to ensure that the fields of a video frame are correctly paired as field1 and field2.

Since the NTSC and PAL masters are created simultaneously from an HDTV telecined master, the transfer will require to be approved only once by the director or other individual responsible for visual quality.

Under certain circumstances, it will be desirable to have the input and outputs of the down-converter running at the same field rate. This can be achieved in one modification by running the telecine so as to produce an output at 59.94 Hz. In this variant, a modified 3-2 pull down signal will be available directly from the telecine.

In a further modification, a recording device is interposed between the HDTV telecine and the down-converter, in this way, through serial recording and replaying operations, the field rate can be converted from 60.00 to 59.94 Hz. The 3–2 pull down signal recorded and played back also, using perhaps a cue track on a VTR. In this way a modified 3–2 pull down signal is produced.

The phase output from the telecine unit 60 can be recorded on the HDTV master for later processing. Suitable carriers are the recorders cue-tracks or time code user bits.

We claim:

1. An apparatus for the simultaneous creation of NTSC and PAL masters from an HDTV telecined master, comprising:

means for receiving a 3-2 pull-down phase signal indicative of the phase of the field processing in the telecine operation from 24 frames per second cinematographic film to 1125 lines and 60 fields per second (1125/60) high definition television (HDTV);

down converter means receiving 1125/60 HDTV input and serving to line convert from 1125 to 525 lines, to field convert from 60 to 59.94 fields per second in dependence upon said phase signal and to create a modified phase signal including identification of dropped fields; and cross converter means receiving 525/59.94 input and to line convert from 525 to 625 lines and to field convert from 59.94 fields per second to 47.952 fields per second in dependence upon said modified phase signal.

2. An apparatus according to claim 1, wherein there is provided phase signal delay means for delaying the phase signal by an integral number of fields.

3. An apparatus for the simultaneous creation of NTSC and PAL masters from an HDTV telecined master, comprising:

first means, including a telecine, for producing from 24 frames per second cinematographic film, a high definition television (HDTV) signal at 1125 lines and 59.94 fields per second (1125/59.94) said first means further providing a modified 3-2 pull-down phase signal indicative of the phase of the field processing in the telecine operation and timed at 59.94 fields per second;

down converter means receiving 1125/59.94 HDTV input and serving to line convert from 1125 to 525 lines; and cross converter means receiving 525/59.94 input and to line convert from 525 to 625 lines and to field convert from 59.94 fields per second to 47.952 fields per second in dependence upon said modified phase signal.

* * * * *